United States Patent [19]

Barnhart et al.

[11] Patent Number: 4,789,290
[45] Date of Patent: Dec. 6, 1988

[54] MACHINE FOR ORIENTING AND STACKING RECEPTACLES

[75] Inventors: Gary A. Barnhart; David E. Carson; Gerald L. Criss, all of Lawrence, Kans.

[73] Assignee: Carson/Burger/Weekly, Inc., Lawrence, Kans.

[21] Appl. No.: 142,299

[22] Filed: Jan. 4, 1988

Related U.S. Application Data

[63] Continuation of Ser. No. 919,609, Oct. 14, 1986, abandoned, which is a continuation of Ser. No. 744,959, Jun. 17, 1985, abandoned.

[51] Int. Cl.⁴ .............................................. B65G 47/24
[52] U.S. Cl. ..................... 414/105; 414/107; 414/112; 414/431; 414/757; 414/30; 198/397; 198/411; 198/462; 198/383; 198/786; 198/415; 198/380
[58] Field of Search ............... 198/397, 786, 467, 411, 198/415, 380, 383, 396, 416, 386; 414/105, 107, 112, 114, 330, 754, 755, 757, 30, 32, 431, 433

[56] References Cited

U.S. PATENT DOCUMENTS

| | | | |
|---|---|---|---|
| 2,597,930 | 5/1952 | Grosvenor | 198/786 |
| 2,916,133 | 12/1959 | Copping | 198/411 X |
| 2,934,378 | 4/1960 | Gilbert | 414/755 X |
| 3,351,388 | 11/1967 | Frank | 414/105 |
| 3,361,246 | 1/1968 | Kukawsui | 198/383 |
| 3,463,293 | 8/1969 | Lederer | 198/786 X |
| 3,503,486 | 3/1970 | Alexander et al. | 198/462 |
| 3,508,640 | 4/1970 | DeGood et al. | 198/411 X |
| 3,624,773 | 11/1971 | Krooss | 198/397 |
| 3,709,349 | 1/1973 | Buhayar et al. | 198/415 X |
| 3,741,366 | 6/1973 | VanMelle et al. | 414/105 X |
| 3,827,582 | 8/1974 | Lederer | 414/107 |
| 3,835,985 | 9/1974 | Johnson | 198/397 |
| 3,924,732 | 12/1975 | Leonard | 198/397 X |
| 4,066,174 | 1/1978 | Collins et al. | 414/107 X |

FOREIGN PATENT DOCUMENTS

| | | | |
|---|---|---|---|
| 1175604 | 8/1964 | Fed. Rep. of Germany | 198/397 |
| 0033261 | 3/1977 | Japan | 198/411 |
| 1017622 | 5/1983 | U.S.S.R. | 198/397 |
| 773156 | 4/1957 | United Kingdom | 414/112 |

Primary Examiner—Frank E. Werner
Attorney, Agent, or Firm—Hovey, Williams, Timmons & Collins

[57] ABSTRACT

A machine for orienting and stacking receptacles, such as cups having a base end and a mouth end, which machine includes a receiving area wherein the cups are initially received and are then fed to an upright, angularly disposed conveyor, the cups being received between bars presented by the conveyor. As the cups are moved upwardly by the conveyor, they come into engagement with an angularly disposed orienting roller which spans the width of the conveyor and contacts the cups to shift them into a common, oriented relationship with the mouths all facing in one direction and the bases in another. After orientation, the cups pass over the top of the conveyor and are removed therefrom and carried to a delivery location. The removal of the cups from the conveyor is accomplished by a vacuum which is drawn adjacent the top end of the conveyor. At the delivery location there is provided a pair of spinning rolls which rotate in the same direction at different speeds and which serve to draw the cups, in their aligned, oriented relationship, therealong and into a final, stacked relationship whereby they may be removed from the machine for subsequent handling or packaging.

2 Claims, 3 Drawing Sheets

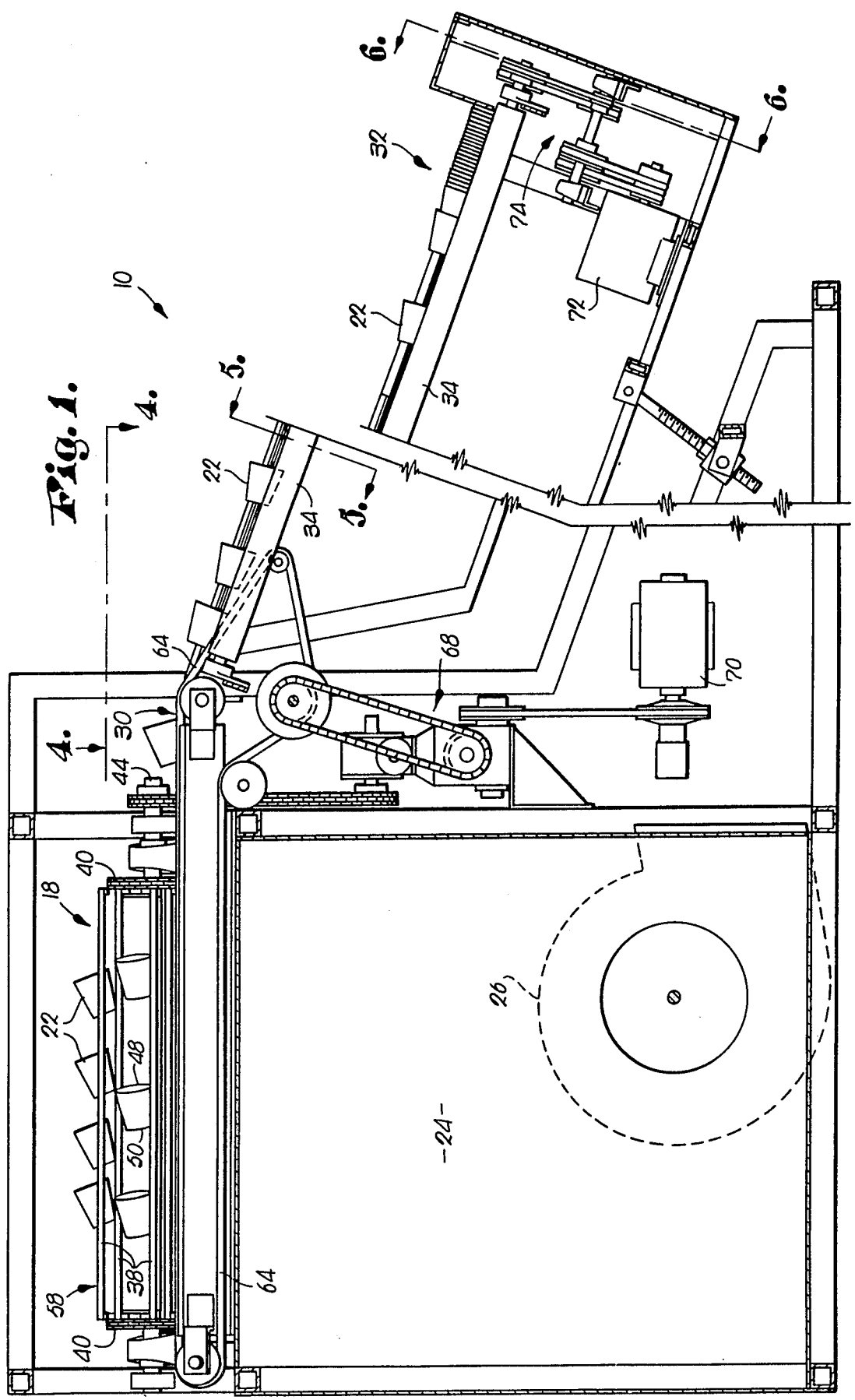

U.S. Patent  Dec. 6, 1988  Sheet 2 of 3  4,789,290
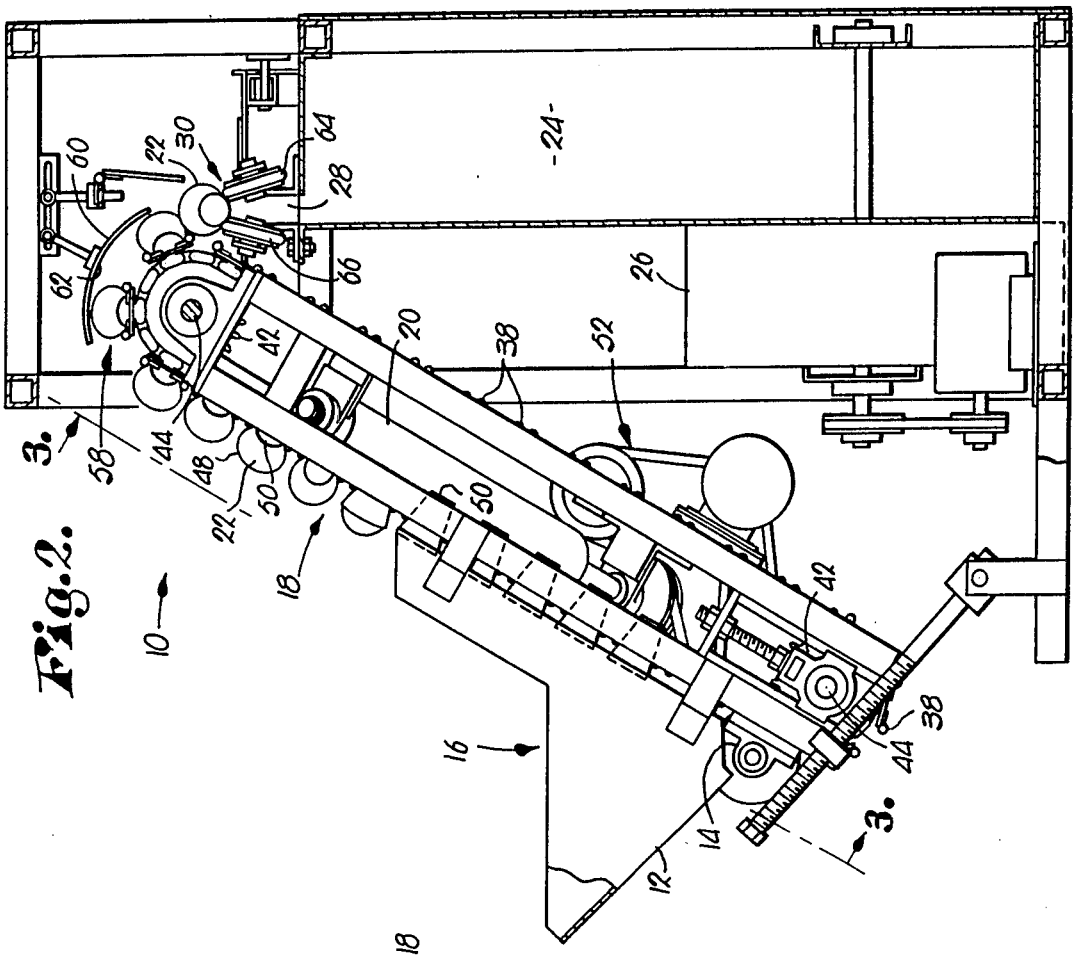
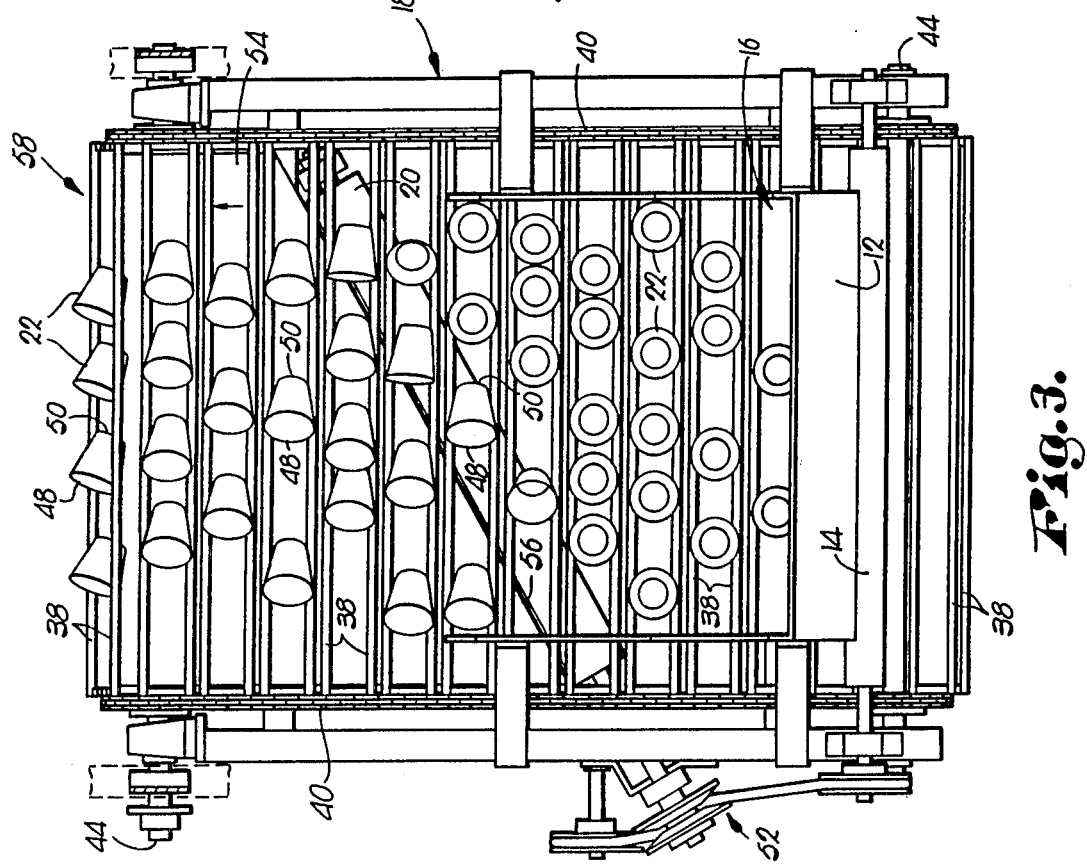

MACHINE FOR ORIENTING AND STACKING RECEPTACLES

This application is a continuation of application Ser. No. 919,609, filed Oct. 14, 1987, now abandoned, which is a continuation of Ser. No. 744,959, now abandoned.

1. Field of the Invention

This invention relates to a machine for handling receptacles, such as plactic cups and the like, as they come from a molding or forming machine. The machine initially unscrambles the receptacles in a receiving area, then places the receptacles on a conveyor for movement along a path from the receiving area to a delivery location. During movement from the receiving area to the delivery location, the receptacles are oriented so that their open mouths, as in the case of a cup, all face the same direction. The oriented receptacles are then carried from the conveyor to the delivery location and, at the delivery location are stacked by a pair of spinning rolls whereby the receptacles may be removed and packaged in stacked, oriented relationship. The machine permits high speed handling of receptacles such as cups and assures that the receptacles, as they come from the molding or forming machine, are all oriented in the same direction whereby they may be readily stacked for packaging.

2. Background of the Invention

In the manufacture of receptacles, such as plastic cups, such receptacles normally are delivered from the molding or forming machine in a scrambled condition. It is desirable to stack the cups, so that they employ a minimum packaging area, and in order that they may be subsequently handled for sale or delivery.

In accomplishing this result it is highly desirable to orient the receptacles so that they may be readily stacked and to accomplish unscrambling of the cups and the orientation thereof at a high speed without the necessity of manual labor.

The present machine accepts, in a receiving area, the cups which have been made by the molding or forming machine and then moves them along a path of travel from the receiving area to a delivery location, the cups being stacked at the delivery location whereby the stacks of cups may be removed and placed in packages. This is all accomplished by a high speed machinery which does not require an operator except for a person to unload the stacks of cups at the delivery location of the machine. The machine is intended to be closely associated with a molding or forming machine whereby cups may be delivered from the molding or forming machine directly to the machine for orienting and stacking the receptacles to provide a continuous, automated operation.

The present machine is intended to handle many types of receptacles, but particularly those which have an open end and a closed end whereby they may be nested in stacks for packaging.

SUMMARY OF THE INVENTION

The machine for orienting and stacking receptacles provides an initial roller which unscrambles the receptacles when they are placed into a receiving area, either manually or by a molding or forming machine. A chain conveyor with spaced apart bars then receives the receptacles between the bars, in disoriented relationship. The conveyor, which is positioned essentially vertical but at an angle, moves the receptacles along a path of movement and into contact with a roller which is angularly disposed with respect to the conveyor and is positioned sufficiently close thereto so that the roller, which is rotated toward the receptacles, contacts the receptacles and causes them to all face the same direction as they are further carried by the conveyor. A backing plate of sheet metal which extends from the angularly disposed roller to the top of the conveyor, ensures that the receptacles are retained in their oriented position. As the receptacles pass over the top of the conveyor, they are pulled from the conveyor by vacuum, which vacuum moves the receptacles onto a carrying assembly, such as a belt conveyor, which carrying assembly moves the receptacles, in oriented relationship, to the delivery location. At the delivery location there is provided a pair of spinning rolls, which move in the same direction but at differing speeds, these rolls receiving the receptacles therebetween from the carrying assembly whereby the receptacles are then rapidly stacked, the stacking being readily and easily accomplished inasmuch as the receptacles are all oriented in the same direction; that is, with their mouths facing one direction and their base end facing the other direction whereby to permit nesting of the receptacles and thus stacking of a plurality thereof.

DESCRIPTION OF THE DRAWINGS

FIG. 1 is a fragmentary, partially sectional rear elevational view of the machine for orienting and stacking receptacles, a portion of the center section of the machine being broken away;

FIG. 2 is an end elevational view of the machine, with parts in section and particularly showing the conveyor assembly, the orienting roller and the means for pulling the receptacles from the top of the conveyor;

FIG. 3 is a partial front elevational view taken on line 3—3 of FIG. 2;

DESCRIPTION OF THE PREFERRED EMBODIMENT

Figure 4:
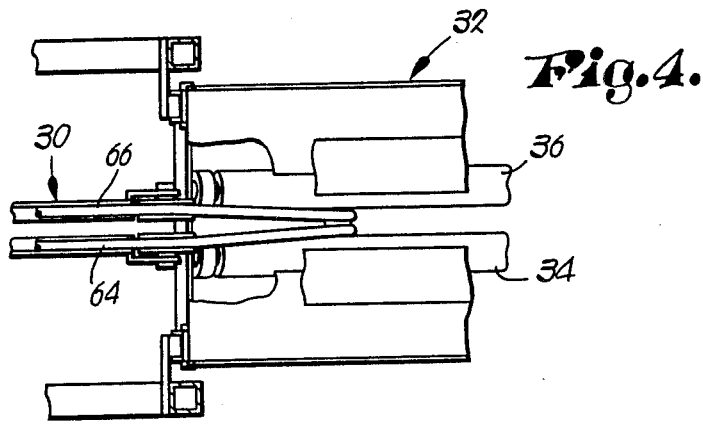
FIG. 4 is a fragmentary view taken on line 4—4 of FIG. 1.

The machine for orienting and stacking receptacles, broadly designated by the numeral 10 is provided for the purpose of unscrambling, orienting and stacking molded or formed plastic receptacles such as, for instance, plastic cups or glasses. The machine includes, as its primary components, a feed chute 12 which receives the receptacles; a feed roller 14 for moving the receptacles through the receiving area 16 onto an upright, angularly disposed conveyor 18 which moves the receptacles along a path of travel where they are engaged by an orienting roller 20, which shifts the receptacles 22 into common, oriented positions.

The receptacles 22 continue upwardly along the conveyor 18 and pass over the top of the conveyor whereupon they are drawn or pulled from the conveyor by means of a vacuum created within a closed housing 24 by a blower 26, the vacuum being pulled through a narrow passage 28 whereby to cause the receptacles 22 to move from the top of the conveyor onto carrying means in the form of a belt conveyor 30, which carries the receptacles in aligned, oriented relationship toward a delivery location 32.

At the delivery location 32 there is provided a pair of spinning rolls 34 and 36 which are driven in the same direction but at different speeds whereby to move the receptacles 22 therealong and into a stacked condition, this being permitted by the common orientation of the receptacles or cups 22 as they move into the delivery location 32 of the machine 10.

Referring more specifically to FIGS. 2 and 3, it is seen that the feed chute 12 is in the general nature of a hopper capable of receiving therewithin a large quantity of the receptacles such as 22. This quantity of receptacles 22 is normally delivered into the feed chute 12 from a molding or forming machine or manually but, in any event, the receptacles 22 are normally in a scrambled condition when they reach the feed chute 12 and the receiving area 16.

Figure 7:
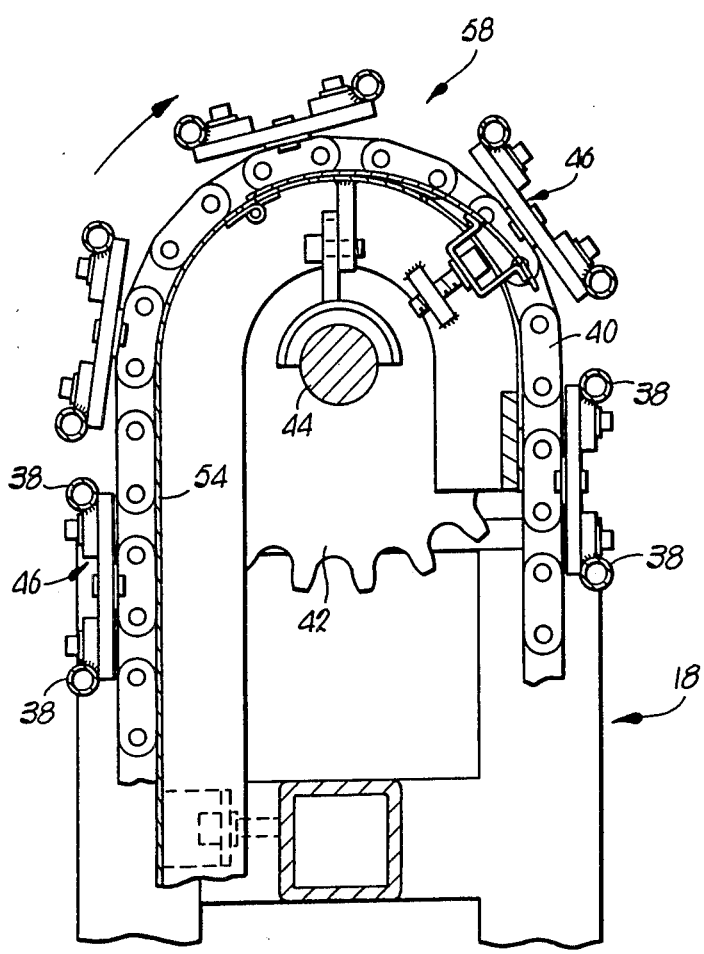
FIG. 7 is an enlarged fragmentary view of the upper end of the conveyor.
Figure 8:
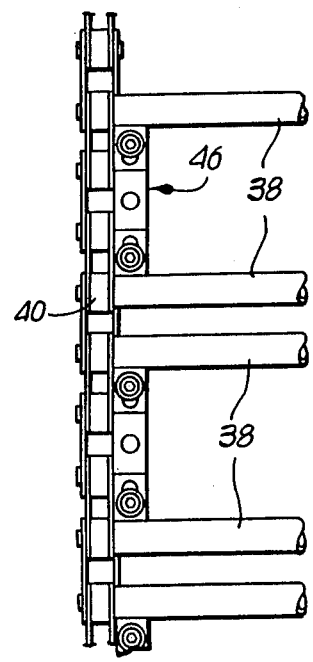
FIG. 8 is an enlarged fragmentary view of a portion of the conveyor, showing the pairs of bars which receive the receptacles.

As the loosely scrambled receptacles move downwardly in the feed chute 12 they are engaged by a feed roller 14 which is suitably driven in a direction toward the conveyor 18 whereby to move the cups or receptacles toward the conveyor 18 and more specifically to drive the cups inbetween one of a plurality of pairs of bars 38 which make up the conveyor 18, the conveyor being a chain driven conveyor whereby the bars 38 span the distance between a pair of spaced apart chains 40, which chains are each trained over opposed sprockets such as 42, shown in FIG. 7, the sprockets being driven by suitable shafts such as 44 which are coupled, through a drive train, with a source of power such as an electric motor.

It will be seen, particularly from FIG. 7, that each of the pairs of bars 38 is carried by a mounting assembly 46 which in turn is connected to the chains 40 of the conveyor 18 whereby the mounting assemblies 46 and their corresponding bars 38 may travel in a generally upright, inclined path, as is best shown by FIG. 2 of the drawing.

The spacing between the bars 38 is adjustable so that the bars may be arranged to accommodate therebetween receptacles of varying sizes, depending upon the dimensions of the receptacles being handled by the machine 10. Thus the bars are spaced apart a sufficient distance that they could receive either the mouth end 48 of a receptacle such as 22 or the base end 50 thereof. In the embodiment illustrated, the bars are spaced apart a distance generally comparable to the diameter of the smaller, normally base end 50 of the receptacles 22 whereby, as the receptacles 22 are urged toward the spaced apart bars by the feed roller 14, they will be driven inbetween the bars, at random, with the mouth facing out.

The receptacles are tightly retained between the bars 38 due to the spacing between the bars as described above. As the conveyor is driven in an upward direction viewing FIGS. 2 and 3, the cups are normally in a generally perpendicular relationship to the plane of the conveyor with the mouth out, as seen in FIG. 2.

The orienting roller 20 is positioned adjacent the conveyor 18 and more particularly in an inclined position spanning the distance between the chains 40 at an angle, as is best shown in FIG. 3 of the drawing. The angle or pitch of the roller 20, with respect to the plane of the conveyor, as defined by the bars 38, is significant and is determined depending upon the nature of the receptacle being handled by the machine 10; an angle or pitch of 30° having been found preferable in handling cups or receptacles of the type illustrated and described.

The angularly disposed orienting roller 20 is driven through a suitable drive train such as 52 whereby to rotate the roller 20 in a direction toward the receptacles which are being moved toward the roller as the conveyor 18 is driven.

As the receptacles come into engagement with the roller 20, they are, due to the pitch of the roller and the rotation thereof towards the receptacles, urged in a direction whereby the mouths 48 of all of the receptacles will face in the same direction with the bases facing in the opposite direction, all as is apparent from FIG. 3 of the drawing. Thus the roller 20 orients the receptacles 22 whereby the mouths 48 of all of such receptacles face in one direction and the bases 50 thereof face in the opposite direction.

In order to ensure that the receptacles are retained in this oriented position, there is provided a backing plate 54 which is in the form of a sheet of metal, best shown in FIG. 7 of the drawing, and which backing plate 54 extends from a position just above the roller 20 to the top of and over the top of the conveyor 18, all as is best shown in FIG. 7 of the drawing. It will be appreciated that, as the receptacles move past the roller 20 and are oriented thereby, the leading edge of the receptacle will continue in engagement with the backing plate 54, whereby the receptacle will be held or retained in the desired, oriented position. The backing plate 54 spans the distance between chains 40 of the conveyor and its lower edge 56 is cut at an angle to accommodate the roller 20, as is shown for instance in FIG. 3 of the drawing.

As the aligned, oriented receptacles move over the top 58 of the conveyor, they are retained in their oriented position between the bars 38 by means of a shroud 60 which has a face 62 which is in engagement with the outer edge of the receptacle as the receptacles are moved over the top of the conveyor as illustrated in FIG. 2 of the drawing.

Once the receptacles have essentially passed over the top of the conveyor 18, they are pulled from the conveyor by means of a vacuum which is generated by blower 26 within closed housing 24, the vacuum being drawn through a narrow passage 28 which passage opens essentially beneath the receptacles 22 as they come over the top 58 of the conveyor 18.

As is known, the receptacles are normally light in weight and the exertion of a substantial pulling force through the generation of a vacuum through a narrow passage 28 causes the receptacles to seat upon the belt conveyor 30, which belt conveyor is in the form of a pair of spaced apart belts as shown for instance in FIG. 4 of the drawing, the belts 64 and 66 constituting the means for carrying the receptacles 22 from the conveyor 18 to the delivery location 32.

The belts 64 and 66 are driven through a suitable drive train 68 by a motor such as 70 which is positioned on the machine 10.

Viewing FIG. 1, for instance, it will be seen that as the receptacles 22 are pulled from the top of the conveyor 18 by the vacuum generated by blower 26, the receptacles seat upon the belts 64 and 66 of conveyor 30 in spanning relationship thereto, and inasmuch as the belts are driven to the right, viewing FIG. 1, the receptacles are moved in that direction in aligned, oriented relationship. It will be appreciated that the cups may be moved in that direction for a greater or shorter distance depending upon the size and configuration of the machine itself as well as adjacent molding or forming machinery.

Figure 5:
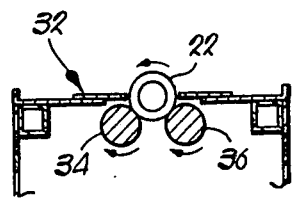
FIG. 5 is a sectional view taken on line 5—5 of FIG. 1.

In any event, the aligned, oriented receptacles or cups 22 are ultimately delivered to a delivery location 32, which delivery location includes the pair of spinning rolls 34 and 36 which, as shown in FIG. 5, are driven in the same direction but at differing speeds.

The spinning rolls 34 and 36 are downwardly inclined from the end of the carrying means toward the delivery location, as is apparent from FIG. 1 of the drawing. Inasmuch as the spinning rolls 34 and 36 are driven in the same direction but at different speeds, the cups will in effect be drawn rapidly along the path between the spinning rolls, as shown in FIG. 5, the cups spanning the distance between the rolls as they move downwardly from the end of the belts 64, 66, toward the delivery location.

It is contemplated that one of the spinning rolls 34 or 36 would be driven at approximately three times the speed of the other spinning roll. It is desirable that the spinning roll which is moving upward against the receptacle be driven at the greater speed. Thus, viewing FIG. 6, which shows the rolls 34, 36 rotating in a clockwise direction, roll 36 would be driven at about three times the speed of roll 34. The faster movement of this roll 36 reduces the friction and causes both a single cup and a stack of cups to be drawn downwardly along the rolls 34, 36 as they are delivered by conveyor 30 whereby to speed the stacking of the receptacles.

As the cups or receptacles 22 move downwardly, at an incline, as shown in FIG. 1, they are nested in stacked relationship between the spinning rolls. Obviously, once a given number of cups or receptacles has been stacked, which may be determined by a suitable counter, they may be removed manually from the machine and placed in suitable cartons, cases or other packaging.

Also contemplated is suitable separating apparatus which would be carried by the machine 10 at the delivery location, whereby the apparatus could be used to push a given number of receptacles 22 back up the spinning rolls thereby freeing the predetermined number of receptacles below the shifting apparatus for removal from the spinning rolls and placement in a suitable package.

Figure 6:
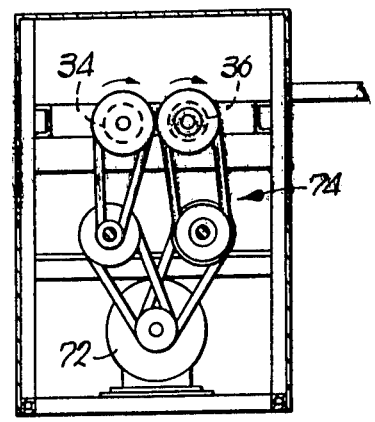
FIG. 6 is a sectional view taken on line 6—6 of FIG. 1 and showing the drive train for the spinning rolls.

The spinning rolls are driven by suitable motor 72, through a drive train broadly designated as 74 and fully shown in FIG. 6 of the drawing. It will be appreciated that the various pulleys included within the drive train 74 may be sized in such a manner as to drive the rolls 34 and 36 at differing speeds but yet in the same direction.

Preferably, the entire machine would be encased within a suitable housing whereby to protect the parts and components thereof. In any event, a rather air-tight housing 24 is desirable for enclosing the blower 26, whereby the vacuum generated thereby may be pulled through the passage 28 and the cups retained upon the belts 64, 66 as they move along the path from the top of the conveyor toward the delivery location. Once the cups have moved beyond the top of the housing 24 and thus are freed from the effect of the vacuum generated by blower 26, they are sufficiently seated between on the conveyor 30 so that they may be carried along their path of movement in aligned, oriented relationship to the spinning rolls 34, 36 for ultimate movement into a stacked condition.

It is within the contemplation of this invention that means may be utilized for conveying unstackable receptacles from their receiving area at least to the top of the conveyor. For instance, the receptacles, such as cans for instance, could be picked up by a tray conveyor and carried upwardly over the top of the conveyor whereupon they would be removed from the conveyor by the force of the vacuum being pulled through passage 28 and such removal would cause the base end of the nonstackable cans to face downwardly, whereby the receptacles would all be carried between the belts 64, 66 in a mouth-up, base-down, oriented position. Given this orientation by means of the blower 26 and the retention of the receptacles in this oriented condition, they could then be moved to a delivery location for subsequently filling, handling or packaging.

We claim:

1. A device for positively moving a plurality of conical cups from an inlet location to a spaced feeding location, and for delivering plural cups at said feeding location in a nested condition, said device comprising:
    a pair of elongated, cylindrical rolls;
    means mounting said rolls in side-by-side, juxtaposed relationship and extending between said inlet and feeding locations,
    the adjacent, arcuate upper surfaces of said side-by-side rolls cooperatively presenting an elongated, concave, cup-receiving zone along the length of the rolls, and
    motive means operably coupled with said rolls for axial rotation of each of the rolls in the same rotational direction such that the upper surface of one of the rolls moves toward the bottom of said cup-receiving zone,
    said rolls being oriented for normally receiving cups in a substantially separate condition at said inlet location, and for conveying said cups along at least a part of the length of said rolls in said substantially separate condition prior to complete nesting thereof,
    said motive means including structure for rotating said other roll at a rotational speed in excess of the rotational speed of said one roll, for assuring smooth movement of said cups in said zone as the cups traverse the length of said rolls.

2. A device as set forth in claim 1 wherein the cylindrical rolls are downwardly inclined from said inlet location to said feeding location.

* * * * *